United States Patent
Tang et al.

(10) Patent No.: US 8,615,360 B2
(45) Date of Patent: Dec. 24, 2013

(54) NAVIGATION SYSTEM WITH SINGLE SELECTION MILEAGE SINGLE CAPTURE MECHANISM AND METHOD OF OPERATION THEREOF

(75) Inventors: Ky Tang, Milpitas, CA (US); Manohar Ellanti, Fremont, CA (US); HaiPing Jin, San Jose, CA (US); Hengbin Luo, San Jose, CA (US)

(73) Assignee: Telenav, Inc., Sunnyvale, CA (US)

( * ) Notice: Subject to any disclaimer, the term of this patent is extended or adjusted under 35 U.S.C. 154(b) by 394 days.

(21) Appl. No.: 12/609,300

(22) Filed: Oct. 30, 2009

(65) Prior Publication Data

US 2011/0106421 A1 May 5, 2011

(51) Int. Cl.
*G01C 21/00* (2006.01)
(52) U.S. Cl.
USPC .......................................... 701/411
(58) Field of Classification Search
None
See application file for complete search history.

(56) References Cited

U.S. PATENT DOCUMENTS

| 4,685,061 A | 8/1987 | Whitaker |
| 4,755,832 A | 7/1988 | Gulas et al. |
| 4,785,666 A * | 11/1988 | Bergquist ...................... 73/40.7 |
| 5,267,159 A | 11/1993 | O'Neall |
| 6,301,533 B1 | 10/2001 | Markow |
| 6,393,346 B1 | 5/2002 | Keith et al. |
| 6,778,900 B2 | 8/2004 | Tengler et al. |
| 6,888,910 B1 * | 5/2005 | Moriarty ...................... 376/367 |
| 7,321,823 B2 | 1/2008 | Brulle-Drews et al. |
| 7,555,378 B2 | 6/2009 | Larschan et al. |
| 2006/0011844 A1 * | 1/2006 | Oka et al. ...................... 250/343 |
| 2006/0124195 A1 * | 6/2006 | Cohen et al. .................... 141/94 |
| 2007/0250258 A1 * | 10/2007 | Hager ........................... 701/201 |
| 2008/0103657 A1 | 5/2008 | Norton et al. |
| 2008/0158018 A1 * | 7/2008 | Lau ......................... 340/995.24 |
| 2009/0150156 A1 * | 6/2009 | Kennewick et al. .......... 704/257 |
| 2010/0198496 A1 * | 8/2010 | Victor et al. .................. 701/201 |
| 2011/0106426 A1 * | 5/2011 | Tertoolen ...................... 701/201 |
| 2011/0257883 A1 * | 10/2011 | Kuznetsov .................... 701/209 |

* cited by examiner

*Primary Examiner* — Thomas Tarcza
*Assistant Examiner* — Adam Alharbi
(74) *Attorney, Agent, or Firm* — IP Investment Law Group

(57) ABSTRACT

A method of operation of a navigation system includes: generating a travel route having a business location for displaying on a device; calculating a current location along the travel route; identifying a travel segment with the current location; calculating a travel distance for the travel segment; and verifying the travel distance based on where the business location is within the travel segment.

20 Claims, 6 Drawing Sheets

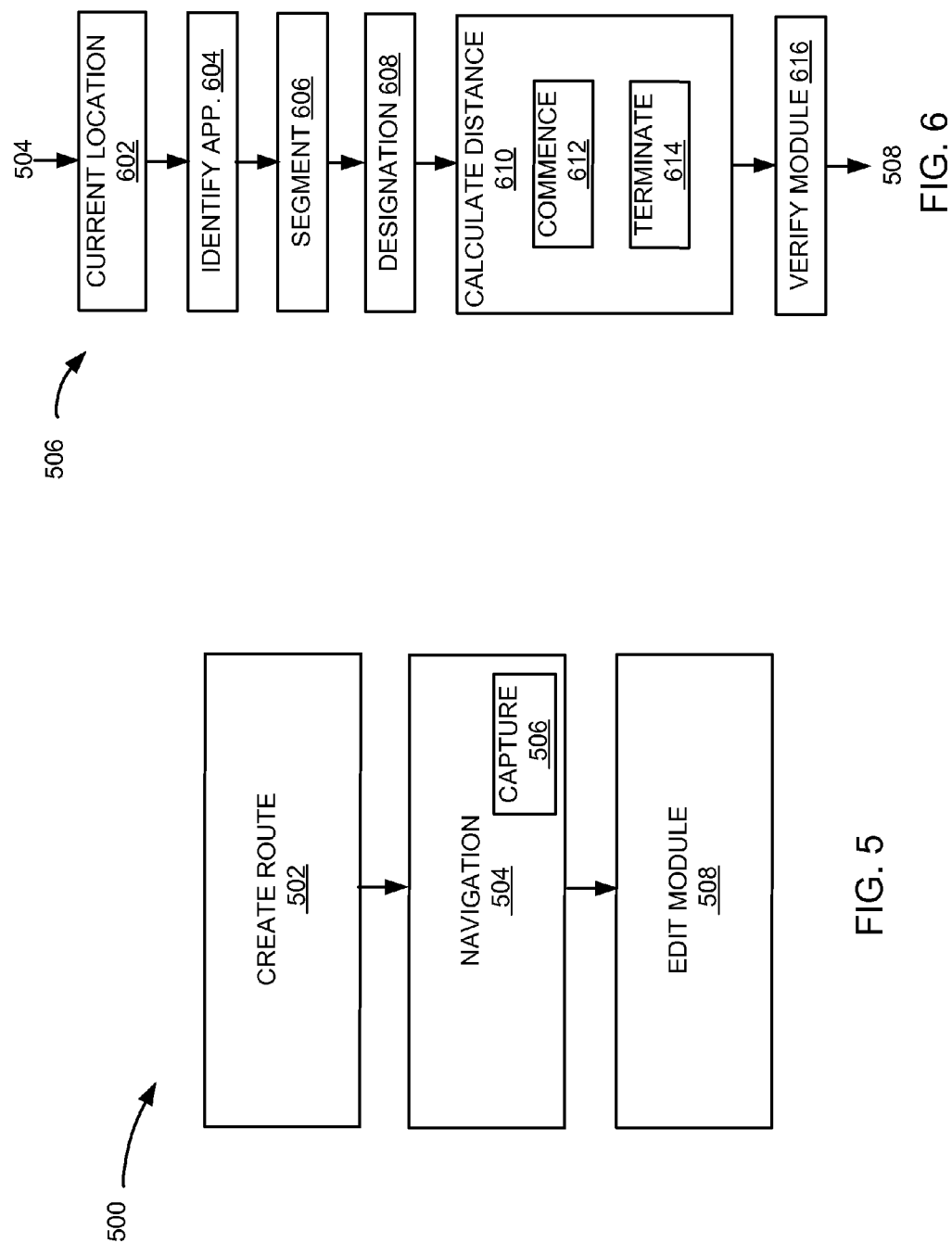

NAVIGATION SYSTEM WITH SINGLE SELECTION MILEAGE SINGLE CAPTURE MECHANISM AND METHOD OF OPERATION THEREOF

TECHNICAL FIELD

The present invention relates generally to a navigation system and more particularly to a system with a navigation system with single selection mileage capture mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Numerous technologies have been developed to utilize this new functionality.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone or a personal digital assistant (PDA).

Location based services allow users to create, transfer, store, and/or consume information that affects the "real world". One such use of location-based services is to provide increased safety features for vehicles.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information, when available or in service areas.

In response to consumer demand, navigation systems are providing ever-increasing functionality. Current navigations systems lack features that accurately track and correct driving statistics. The lack of these features entail safety risks as drivers many be distracted by tracking their own statistics manually. Simple tools that can monitor and track driver statistics can decrease accidents and reduce costs.

Thus, a need still remains for a navigation system with single selection mileage single capture mechanism providing low cost, improved functionality, and improved reliability. In view of the ever-increasing need to save costs and improve efficiencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a travel route having a business location for displaying on a device; calculating a current location along the travel route; identifying a travel segment with the current location; calculating a travel distance for the travel segment; and verifying the travel distance based on where the business location is within the travel segment.

The present invention provides a navigation system including: a create route module for generating a travel route having a business location for displaying on a device; a current location module, coupled to the create route module, for calculating a current location along the travel route; a segment module, coupled to the current location module, for identifying a travel segment with the current location; a calculate distance module, coupled to the segment module, for calculating a travel distance for the travel segment; and a verify module, coupled to the calculate distance module, for verifying the travel distance based on where the business location is within the travel segment.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 5 is a navigation system with single selection mileage single capture mechanism in a third embodiment of the present invention.

FIG. 6 is a detailed view of the capture module of FIG. 5.

BEST MODE FOR CARRYING OUT THE INVENTION

Figure 1:
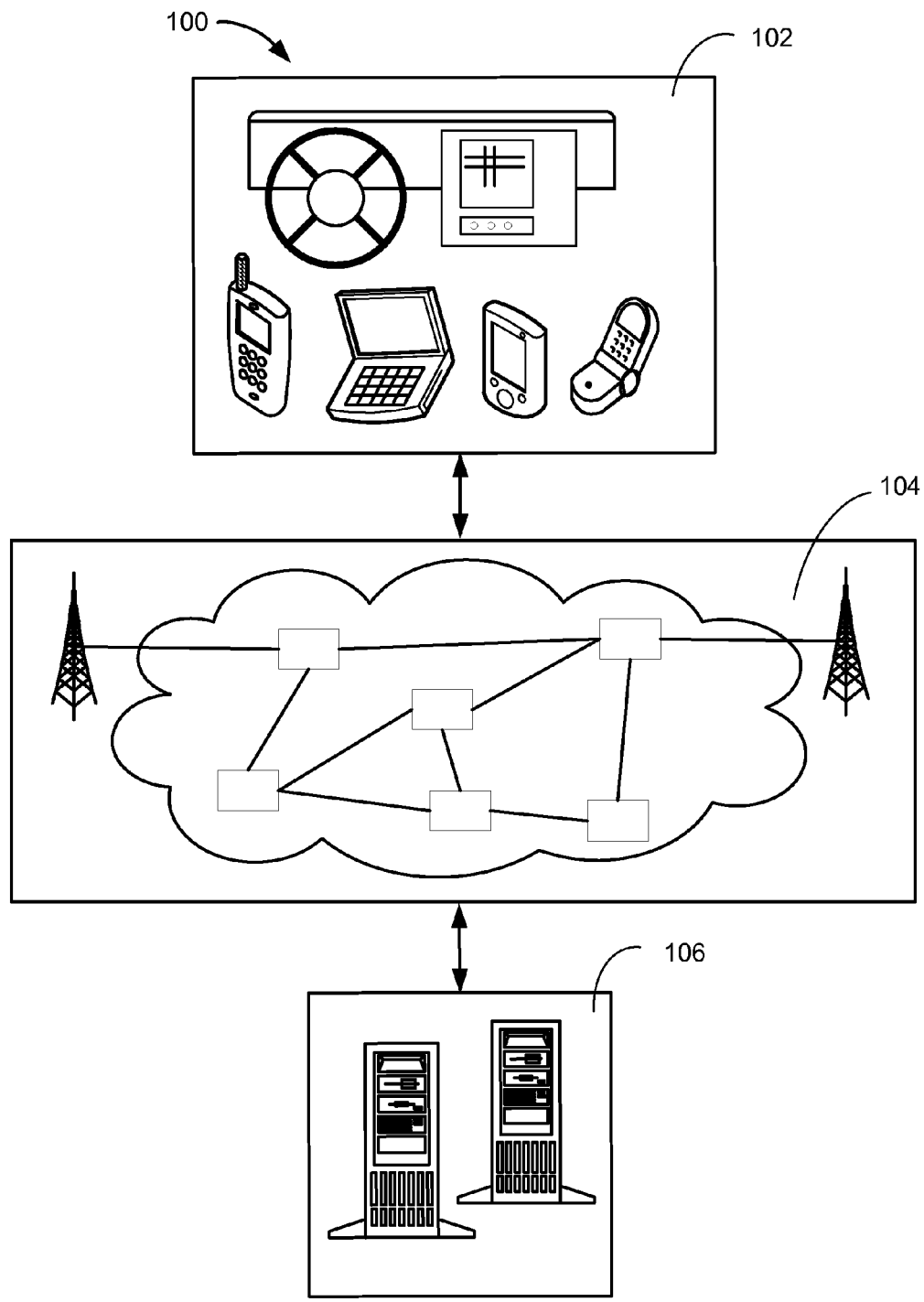
FIG. 1 is a navigation system with single selection mileage single capture mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with single selection mileage single capture mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telemetric navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
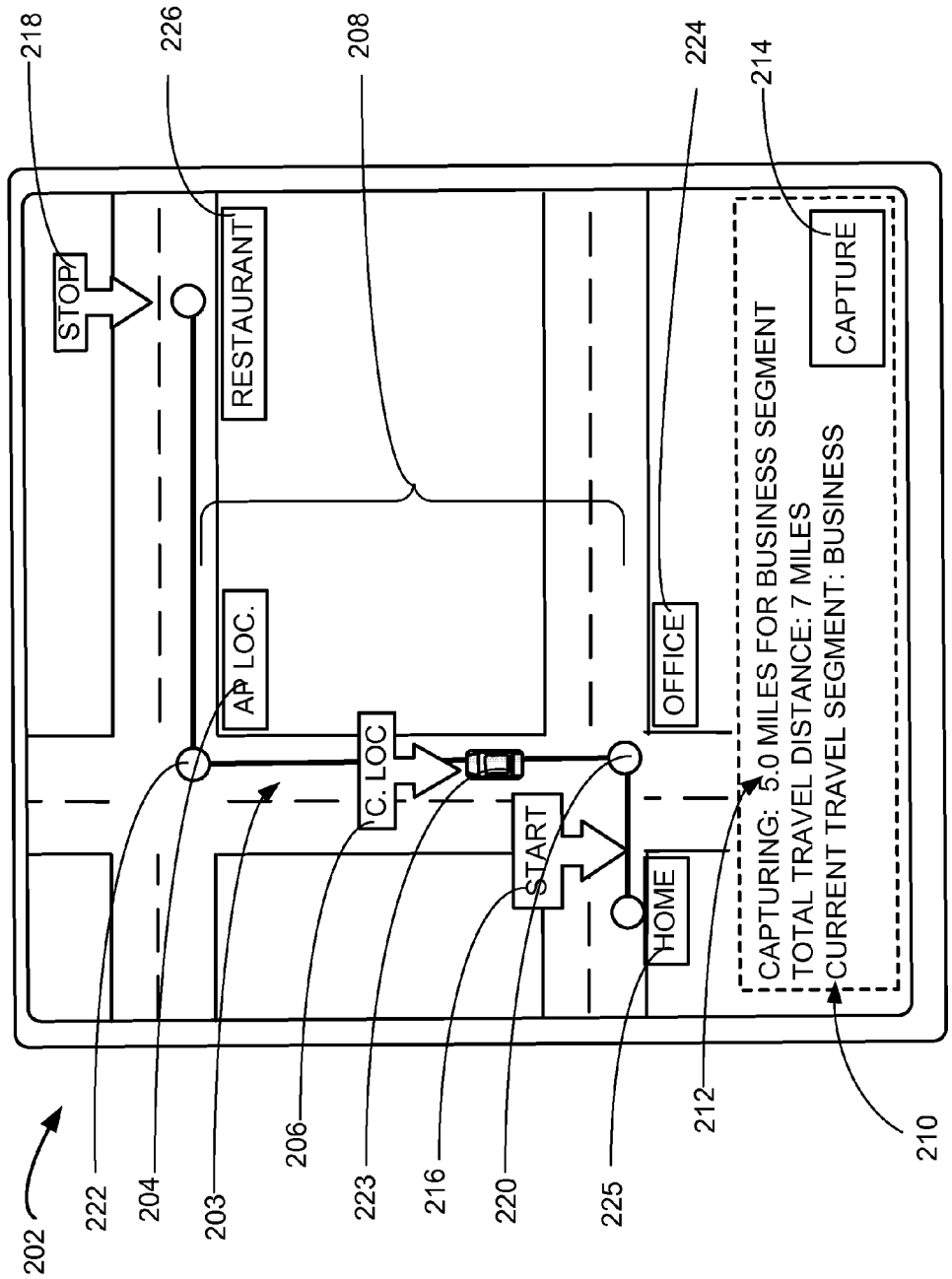
FIG. 2 is an example of a display interface of the first device of FIG. 1.

Referring now to FIG. 2, therein is shown an example of a display interface 202 of the first device 102 of FIG. 1. The display interface 202 can depict a travel route 203, a current location 206, a travel segment 208, and a travel distance 212. The display interface 202 also can depict a business location 204, an appointment location 205, a single capture 214, a start 216, and a stop 218.

The travel route 203 can be generated by the navigation system 100 of FIG. 1 for navigating to a destination. The travel route 203 can begin at a home 225 and proceed to an office 224, then to the business location 204, and then finish at a restaurant 226. A traversal 223 can represent a vehicle traveling along the travel route 203.

The business location 204 can represent a business appointment along the travel route 203. The business location 204 can be user-defined when the travel route 203 is generated. The appointment location 205 can represent other stops or destinations along the travel route 203 that are not designated as business. On the display interface 202, the home 225, the office 224, and the restaurant 226 can represent the appointment location 205.

The current location 206 can represent the current geographical position of the first device 102 of FIG. 1. The display interface 202 can depict the current location 206 as the current position of a vehicle as the vehicle traverses the travel route 203.

The travel segment 208 can represent a division of the travel route 203 that can be labeled with a segment designation 210. For example, the segment designation 210 can be business or non-business. The travel segment 208 and the segment designation 210 can allow a user to label and record portions of the travel route 203 as business or non business. The boundaries of the travel segment 208 can be automatically determined or user-defined. The travel segment 208 can add together to form the complete route of the travel route 203.

For example, the travel segment 208 between a beginning 220 and the office 224 can represent the first part of the travel route 203. The beginning 220 represents the starting point of the travel segment 208. This section of the travel route 203 can have the segment designation 210 of non-business because the trip was made from the home 225 to the office 224, which under the laws of some countries does not qualify as a business trip for tax purposes.

Further for example, the travel segment 208 from the office 224 to the business location 204 can represent the second part of the travel route 203. This example of the travel segment 208 can have the segment designation 210 of business because the business location 204 can represent a business trip. The travel segment 208 can include the beginning 220, and an end 222.

The office 224 can represent the beginning 220 of the travel segment from the office 224 to the business location 204. The home 225 can also represent the beginning 220 of the travel segment 208 between the home 225 and the office 224.

The end 222 can represent the ending point of the travel segment 208. The end 222 is at the opposite end of the travel segment 208 from the beginning 220. On the display interface 202, the restaurant 226 can represent the end 222 of the travel segment 208 from the business location 204 to the restaurant 226.

The travel distance 212 can represent the length of the travel route 203 and the length of the travel segment 208 in distance units. Distance units can include miles, meters, kilometers, or yards. The travel distance 212 can be recorded as the first device 102 of FIG. 1 traverses the travel route 203. The travel distance 212 for the travel segment 208 can be single captured simultaneously and independently from the total mileage single capture of the travel route 203.

The single capture 214 can represent initiating the mileage single capture process. The single capture 214 can be initiated with a button labeled "capture" on the display interface 202 or through voice command. The single capture 214 can be initiated a single time with a single selection while traversing the travel route 203 or multiple times during the travel route 203. For example, if the single capture 214 is initiated with a single selection, the navigation system 100 will begin to commence mileage recording and will automatically record the mileage for each of the travel segment 208 before terminating the process at the conclusion of the travel route 203. The navigation system 100 can record the total mileage for the travel route 203 and each of the travel segment 208.

Further for example, the function of the single capture 214 allows capture with a single action but does not preclude that the capture can also be initiated multiple times, as an example, representing manual control from the user of the first device 102. The single capture 214 can also represent the process of manually determining the boundaries of the travel segment 208. Using multiple toggles of the button for the single capture 214, the user can manually determine the number of the travel segment 208 within the travel route 203, the boundaries of the travel segment 208, and the travel distance 212 assigned to the travel segment 208.

Each toggle of the single capture 214 represents a single action per the travel segment 208. If the travel route 203 is the travel segment 208, then the single capture 214 represents the single action for entirety of the travel route 203.

The start 216 can represent the time and location when the single capture 214 was initiated or when distance metric is being recorded. For example, while traveling along the travel route 203, the start 216 can occur anytime during the travel route 203 and when the user toggles the button for the single capture 214.

The stop 218 can represent the time and location when mileage recording has stopped or terminated. The stop 218 can be user-initiated or automatically initiated. For example, at the end 222 of the travel route 203, the user can toggle the single capture 214 to terminate the mileage recording. The navigation system 100 can also terminate the mileage recording automatically when the vehicle has reached the end of the travel route 203.

Figure 3:
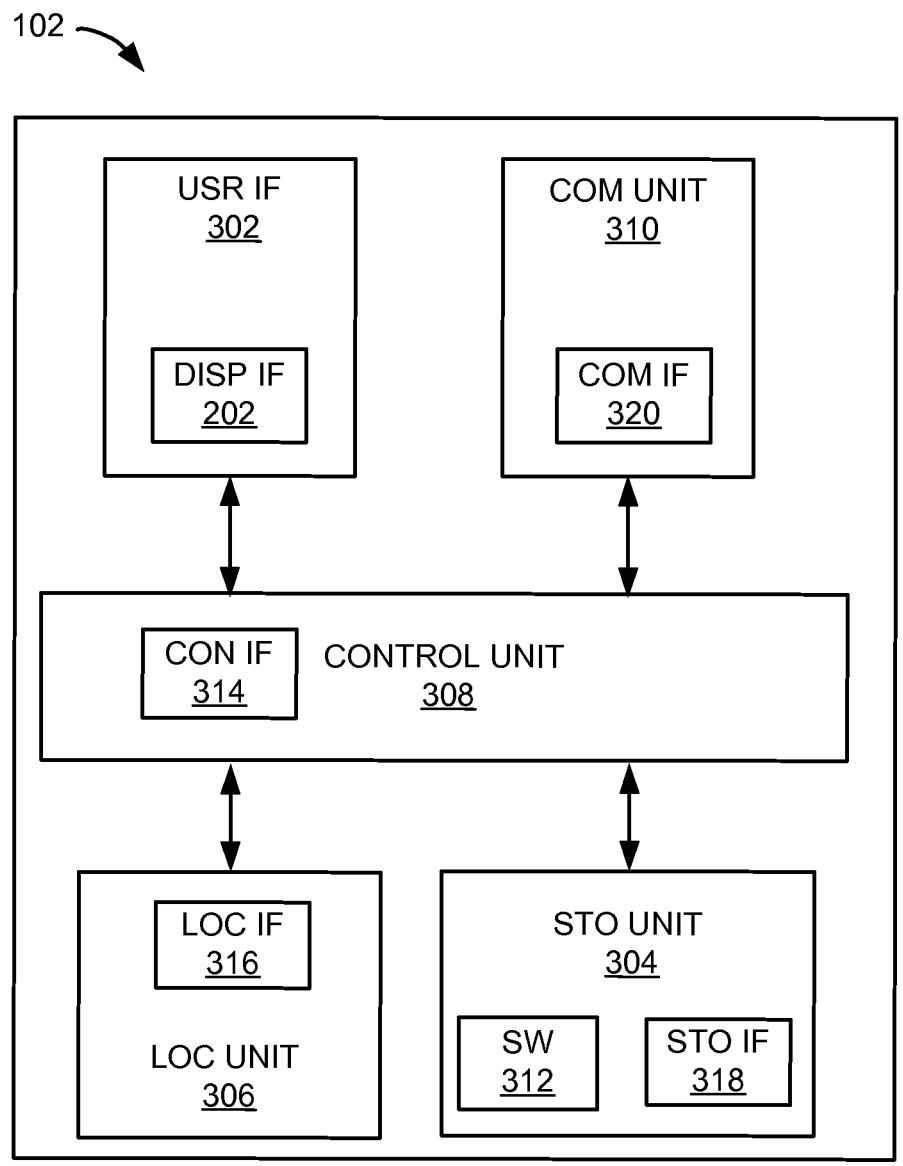
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
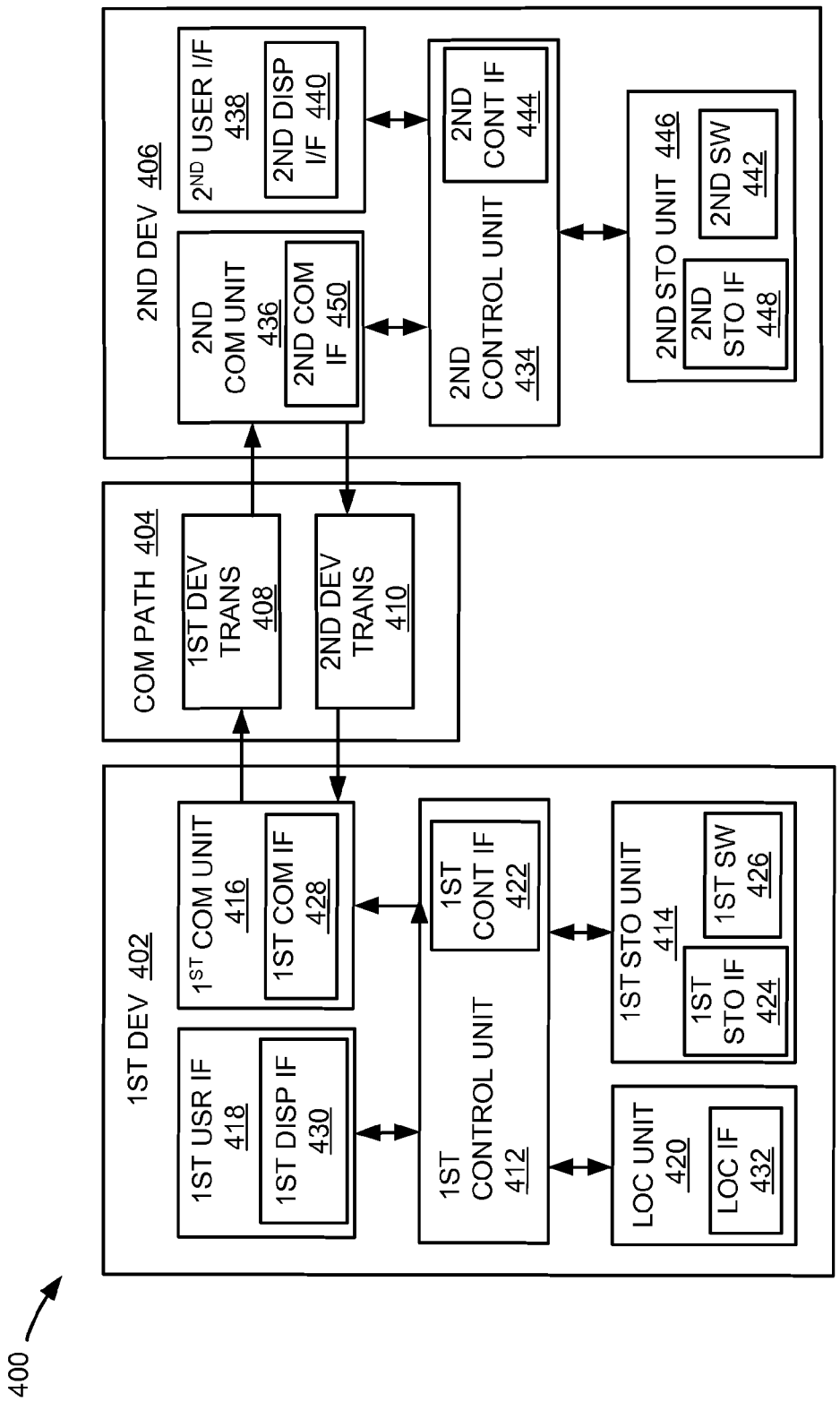
FIG. 4 is an exemplary block diagram of a navigation system with single selection mileage single capture mechanism in a second embodiment of the present invention.

Referring now to FIG. 4, therein is shown an exemplary block diagram of a navigation system 400 with single selection mileage single capture mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first control interface 422. The first control unit 412 and the first control interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Referring now to FIG. 5, therein is shown a navigation system 500 with single selection mileage single capture mechanism in a third embodiment of the present invention. The navigation system 500 can include a create route module 502, a navigation module 504, and an edit module 508. In the navigation system 500, as an example, each module is indicated by a number and successively higher module numbers follow one another. Control flow can pass from one module to the next higher numbered module unless explicitly otherwise indicated.

The create route module 502 can receive travel information and generate the travel route 203 of FIG. 2. For example, the create route module 502 can receive the appointment location 205 of FIG. 2 and the business location 204 of FIG. 2 to generate the travel route 203 of FIG. 2. The create route module 502 can use the control unit 308 of FIG. 3 to generate the travel route 203. The create route module 502 can also use the first control unit 412 of FIG. 4, the second control unit 434 of FIG. 4, or a combination thereof to generate the travel route 203.

The navigation module 504 can provide instructions for navigating the travel route 203. The navigation module 504 can include a capture module 506. The capture module 506 can identify the travel segment 208 of FIG. 2 and calculate the travel distance 212 of FIG. 2. The capture module 506 will be explained in greater detail below.

The navigation module 504 can display routes and can provide instructions for navigating to destinations. The navigation module 504 can use the control unit 308, the communication unit 310 of FIG. 3, the location unit 306 of FIG. 3, or a combination thereof to provide instructions for navigation. The navigation module 504 can use the display interface 202 of FIG. 3 to display routes. The navigation module 504 can also use the first control unit 412, the second control unit 434, the first communication unit 416 of FIG. 4, the second communication unit 436 of FIG. 4, the location unit 420 of FIG. 4, or a combination thereof to provide instructions for navigation. The navigation module 504 can also use the first display interface 430 of FIG. 4 to display routes.

The edit module 508 can modify the travel distance 212 for the travel segment 208 and the boundaries of the travel segment 208. For example, the edit module 508 can allow a user to modify the mileage recorded for each of the travel segment 208 after the conclusion of the travel route 203. The edit module 508 can allow a user to adjust the boundaries of the travel segment 208 on the travel route 203. The edit module 508 can also allow a user to modify the segment designation 210 of FIG. 2 of the travel segment 208.

The edit module 508 can upload the travel route 203, the travel segment 208, the segment designation 210, and the travel distance 212 to internet websites for review and editing. The edit module 508 can use the control unit 308 to modify the travel distance 212. The edit module 508 can also use the communication unit 310 to upload mileage information. The edit module 508 can use the first control unit 412, the second control unit 434, or a combination thereof to modify the travel distance 212. The edit module 508 can also use the first communication unit 416, the second communication unit 436, of a combination thereof to upload mileage information.

The navigation system 500 describes the module functions or order as an example. The modules can be partitioned differently. For example, the create route module 502, the navigation module 504, and the edit module 508 can be implemented as one module or with lesser number of modules. Each of the modules can operate individually and independently of the other modules.

The navigation system 500 can be partitioned between the first device 402 of FIG. 4 and the second device 406 of FIG. 4. For example, the navigation system 500 can be partition into the functional units of the first device 402, the second device 406, or a combination thereof. For example, the create route module 502 and the edit module 508 can be partitioned on the second device 406. The navigation module 504 can be partitioned on the first device 402. The navigation system 500 can also be implemented as additional functional units in the first device 102 of FIG. 1, the first device 402, the second device 406, or a combination thereof.

Referring now to FIG. 6, therein is shown a detailed view of the capture module 506 of FIG. 5. The capture module 506 can identify the travel segment 208 of FIG. 2 and calculate the travel distance 212 of FIG. 2.

The capture module 506 can include a current location module 602, an identify appointment module 604, a segment module 606, a designation module 608, a calculate distance module 610, and a verify module 616. The modules within the capture module 506, as an example, can be indicated by a number and successively higher module numbers follow one another. Control flow can pass from one module to the next higher numbered module unless explicitly otherwise indicated.

The current location module 602 can calculate the current location 206 of FIG. 2. The current location module 602 can be executed with the control unit 308 of FIG. 3 to calculate the current location 206. The current location module 602 can also executed with the first control unit 412 of FIG. 4, the second control unit 434 of FIG. 4, or a combination thereof to calculate the current location 206. The current location module 602 can operate the location unit 306 of FIG. 3 to ascertain the geographic location of the first device 102. The current location module 602 can operate the location unit 420 of FIG. 4 to ascertain the geographic location of the first device 402 of FIG. 4.

The identify appointment module 604 can identify the appointment location 205 of FIG. 2 that is closest to the current location 206. The identify appointment module 604 can also identify if the business location 204 of FIG. 2 is closest to the current location 206. The identify appointment module 604 also determines whether the business location 204 or the appointment location 205 is closest to the current location 206.

The identify appointment module 604 can identify can utilize user entry for the types of appointments, such as business or non-business. Past trips can also be used to provide classifications of appointment types. The identification can also use the navigation information, such as global positioning system (GPS) reading, with information for the point of interest at that location to determine whether the location is a business location or a non-business location. The identification can also utilize user's contact information or other business feeds, such as Internet yellow pages or professional social networking groups.

The identify appointment module 604 can use the control unit 308 to identify the appointment location 205. The identify appointment module 604 can also use the first control unit 412, the second control unit 434, or a combination thereof to identify the appointment location 205.

The identify appointment module 604 can operate the location unit 306 to ascertain the geographic location of the first device 102. The identify appointment module 604 can operate the location unit 420 to ascertain the geographic location of the first device 402. The identify appointment module 604 can operate the communication unit 310 to access the Internet or other business feeds as mentioned above. The identify appointment module 604 can operate the first communication unit 416, the second communication unit 436, or a combination thereof.

The segment module 606 determines whether a portion of the travel route 203 is the travel segment 208. The segment module 606 can receive from the identify appointment module 604 the determination of the appointment location 205 or the business location 204 as closest to the current location 206 when the single capture 214 of FIG. 2 is invoked.

The segment module 606 determines if the appointment location 205 or the business location 204 from the identify appointment module 604 is at the beginning 220 of FIG. 2 or at the end 222 of FIG. 2 of the travel segment 208.

If the single capture 214 is invoked at the business location 204, then that portion of the travel route 203 is the travel segment 208 with the start 216 of the single capture 214 at the beginning 220 of FIG. 2 or at the end 222 of FIG. 2 of the travel segment 208. If the single capture 214 is invoked at the appointment location 205, then that portion of the travel route 203 is the travel segment 208 with the start 216 of the single capture 214 at the beginning or at the end 222 of the travel segment 208.

The segment module 606 can use the control unit 308 to determine the appointment location 205. The segment module 606 can also use the first control unit 412, the second control unit 434, or a combination thereof to detect the appointment location 205. The segment module 606 can operate the location unit 306 to ascertain the geographic location of the first device 102. The segment module 606 can operate the location unit 420 to ascertain the geographic location of the first device 402.

The designation module 608 can identify the segment designation 210 of FIG. 2 as a business or non-business designation for the travel segment 208 from the segment module 606. If the segment module 606 determines the business location 204 is at the beginning 220 or at the end 222 of the travel segment 208, then the segment designation 210 for the travel segment 208 is a business designation.

The designation module 608 can also identify the segment designation 210 of the travel segment 208 as non-business if the current location 206 is not near the business location 204. For example, if the current location 206 is between two of the appointment location 205 or the business location 204 is not at the beginning 220 of, at the end 222 of, or within the travel segment 208, then the segment designation 210 for the travel segment 208 is a non-business designation.

If the identify appointment module 604 identifies the appointment location 205, which represents a non-business appointment, is closest to the current location 206, then the segment module 606 determines whether the business location 204 is at opposite end of the travel segment 208 relative to the appointment location 205 with the current location 206 in between. If so, then the segment designation 210 for the travel segment 208 is a business designation. The display interface 202 of FIG. 2 can depict an exception based on local tax laws when the current location 206 for the travel segment 208 that is non-business can be in-between the home 225 of FIG. 2 and the office 224 of FIG. 2.

If the identify appointment module 604 identifies the business location 204 is closest to the current location 206, then the segment module 606 determines that the segment designation 210 for the travel segment 208 is a business designation.

The designation module 608 can use the control unit 308 of FIG. 3 to identify the segment designation 210. The designation module 608 can also use the first control unit 412, the second control unit 434, or a combination thereof to identify the segment designation 210.

The calculate distance module 610 can calculate the travel distance 212 of FIG. 2 of the single capture 214 of FIG. 2. The calculate distance module 610 can calculate the travel distance 212 for each of the travel segment 208 and for the total distance traveled while traversing the travel route 203. The calculate distance module 610 can include a commence module 612 and a terminate module 614.

The commence module 612 can commence the single capture 214 of the travel distance 212 while traversing the travel route 203. The commence module 612 can use the current location 206 to determine the start 216 of FIG. 2 for capturing mileage. If the single capture 214 is operated manually, the commence module 612 can correct the beginning 220 or the end 222 of the travel segment 208 to the appointment location 205 or the business location 204.

If the single capture 214 is invoked when the current location 206 indicates the user has not yet reached the appointment location 205 or the business location 204, then the commence module 612 can modify the start 216 as well as the beginning 220, the end 222, or a combination thereof to the appointment location 205 or the business location 204. If the single capture 214 is invoked after the current location 206 reached and continued from the appointment location 205 or the business location 204, then the commence module 612 can correct the travel distance 212 by modifying the start 216 as well as the beginning 220, the end 222, or a combination thereof to the appointment location 205 or the business location 204. This correction marks the beginning 220 or the end 222 of the travel segment 208.

For example, the commence module 612 can correct the travel segment 208 by modifying the commencement of the single capture 214 to the actual starting point of the travel segment 208. If the start 216 is commenced too early or after passing the appointment location 205 or the business location 204, the travel distance 212 and the boundaries of the travel segment 208 can be inaccurate.

The travel distance 212 can be corrected by modifying the location of the start 216 of the single capture 214 to the appointment location 205 or the business location 204. By automatically correcting the boundaries for the travel segment 208 to the appointment location 205 or the business location 204, the start 216 of the single capture 214 will be modified to the beginning 220 or the end 222 of the travel segment 208.

On the display interface 202 of FIG. 2, the single capture 214 was toggled at the start 216 before the vehicle arrived at the office 224. The navigation system 100 of FIG. 1 can commence recording mileage at the start 216 but can also correct the beginning 220 or the end 222 of the travel segment 208 by modifying the start 216 to the office 224. The modifying process can automatically recalibrate the travel distance 212 for the travel segment 208 with the corrected boundaries for the single capture 214 while still recording the total mileage for the trip from the start 216. The navigation system 100 can record both the manual single capture for the travel segment 208 and the recalibrated mileage for the travel segment 208.

The terminate module 614 can terminate the single capture 214 of the travel distance 212 while traversing the travel route 203. The terminate module 614 can automatically terminate the single capture 214. For example, if the current location 206 is at the end 222, the single capture 214 can be automatically terminated. As another example, if the current location 206 reaches the business location 204 or the appointment location 205, the single capture can be automatically terminated. The user can also terminate the single capture 214 manually by toggling the button assigned to the single capture 214.

The terminate module 614 can also correct the end 222 of the travel segment 208 if the single capture 214 is manually toggled prior to or after passing the ending point of the travel segment 208 by modifying it to the correct position. The travel distance 212 for the travel segment 208 can recalibrate while still recording the mileage from the mileage recording. The terminate module 614 can also automatically or manually define the end 222 of the travel segment 208.

The calculate distance module 610, the commence module 612, and the terminate module 614 can use the control unit 308 to calculate the travel distance 212. The calculate distance module 610, the commence module 612, and the terminate module 614 can also use the first control unit 412, the second control unit 434, or a combination thereof to calculate the travel distance 212.

The verify module 616 can verify that the travel distance 212 is correct for each of the travel segment 208 along the travel route 203. The verify module 616 can verify the identify appointment module 604 correctly identified the business location 204 or the appointment location 205 being the closest to the current location 206 at the time the single capture 214 was invoked.

This additional verification can determine the business location 204 or the appointment location 205 by utilizing more extensive computer power or more extensive database that would not otherwise be feasible in real-time operation, for example, while traversing the travel route 203. The additional verification can also access user generated content (UGC) to determine if the standard point of interest information is not up to date and changes to the location may have occurred, such as closing down.

The verify module 616 can also verify whether the commence module 612 and the terminate module 614 have correctly calibrated or corrected the travel segment 208 and the travel distance 212 for that capture of the travel segment 208. The verify module 616 can also verify that the total mileage of each of the travel segment 208 equals the same as the total mileage for the travel route 203 that was traversed.

Through the additional verification above, if the verify module 616 determines that the previously identified location is not the business location 204 but another location is a correct identification of the business location 204, then the verify module 616 can adjust the travel segment 208. As an example, the different location of the business location 204 or the appointment location 205 can be outside or within the previously identified version of the travel segment 208. The travel segment 208 can be adjusted using the calculate distance module 610. The verify module 616 can provide the business location 204 to the calculate distance module 610 to correct the input from the identify appointment module 604.

The verify module 616 can adjust the travel distance 212 of the travel segment 208 by adjusting the beginning 220 of the travel segment 208, the end 222 of the travel segment 208, or a combination thereof to match the newly determined location of the business location 204 or the appointment location 205. The correction is then re-verified by the verify module 616 for overall accuracy not just for the travel segment 208 that has been corrected but for the overall distance of the travel route 203.

As another example, the verify module 616 can use the logic similar to the calculate distance module 610 and compare the business location 204 or the appointment location 205 from the identify appointment module 604 and location generated by the verify module 616. This comparison can lead to adjustments to the operation of the identify appointment module 604 or the information available to the identify appointment module 604.

It has been discovered that the present invention provides a navigation system with single selection mileage single capture mechanism for accurately capturing mileage for travel segments that are for business or non-business. The single selection mechanism increases driver safety by allowing a user to single capture mileage and define travel segments with a touch of a single button. The navigation system can automatically determine if the travel segment is business or non-business based on the travel route and the appointment location and adjust the travel distance for the business travel segment and the non business travel segment.

It has also been discovered that the present invention provides a navigation system with single selection mileage single capture mechanism that can correct user-defined travel segments based on the traversal of the travel route. The navigation system can adjust mileages single captures by modifying the beginning and the end of the travel segments to the actual locations that were traversed during the trip. The navigation system can also recalibrate the travel distance for each of the travel segments. The navigation system unexpectedly increases convenience and driver safety while accurately recording mileage for records, tax, and personal reasons.

The physical transformation of the single capture 214, the business location 204, the appointment location 205, the current location 206, the travel segment 208, the travel distance 212, and the segment designation 210 results in movement in the physical world, such as people using the first device 102, the first device 402, the second device 402, or vehicles, based on the operation of the navigation system 500. As the movement in the physical world occurs, the movement itself creates additional information that is converted back to the travel segment 208, the travel distance 212, and the segment designation 210 for the continued operation of the navigation system 500 and to continue the movement in the physical world.

Figure 7:
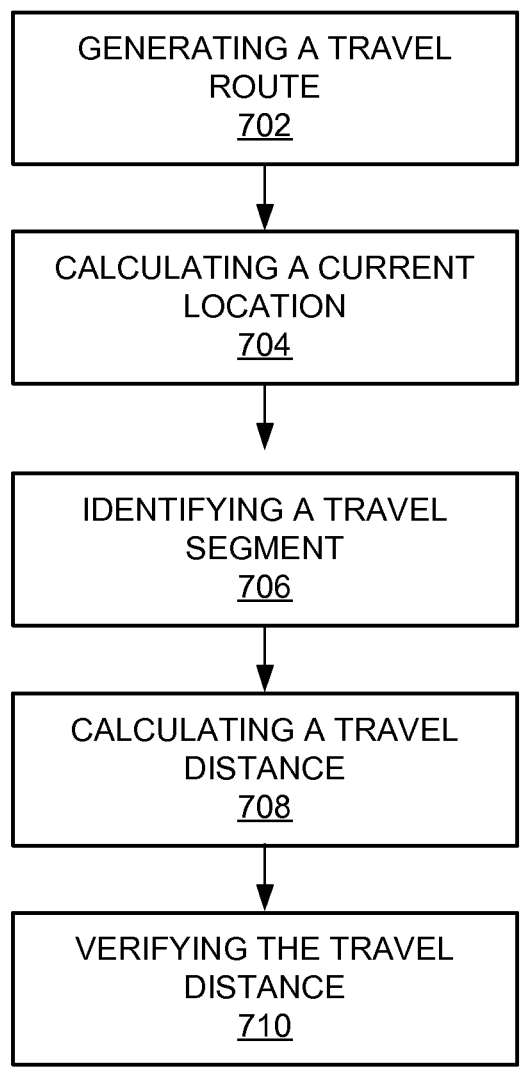
FIG. 7 is a flow chart of a method of operation of a navigation system in a further embodiment of the present invention.

Referring now to FIG. 7, therein is shown a flow chart of a method 700 of operation of a navigation system in a further embodiment of the present invention. The method 700 includes: generating a travel route having a business location for displaying on a device in a block 702; calculating a current location along the travel route in a block 704; identifying a travel segment with the current location in a block 706; calculating a travel distance for the travel segment in a block 708; and verifying the travel distance based on where the business location is within the travel segment in a block 710.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating a travel route having a business location for displaying on a device;
calculating a current location along the travel route with a control unit;
identifying a travel segment with the current location;
capturing a travel distance for the travel segment;
verifying the travel distance captured based on where the business location is within the travel segment; and
correcting the travel distance captured based on modifying a beginning and an end of the travel segment based on a location traversed on the travel route.

2. The method as claimed in claim 1 wherein identifying the travel segment with the current location includes identifying a segment designation as business for the travel segment when the business location is at the beginning or at the end of the travel segment.

3. The method as claimed in claim 1 wherein identifying the travel segment with the current location includes identifying a segment designation as non-business for the travel segment when the business location is not at the beginning or at the end of the travel segment.

4. The method as claimed in claim 1 wherein capturing the travel distance for the travel segment includes:
commencing a single capture of the travel distance with the current location has not yet reached the business location; and
correcting the travel distance by modifying a start of the single capture with the business location at the end of the travel segment.

5. The method as claimed in claim 1 wherein capturing the travel distance for the travel segment includes:
commencing a single capture of the travel distance; and
terminating the single capture of the travel distance when the business location is at the end of the travel segment.

6. A method of operation of a navigation system comprising:
generating a travel route having a business location for displaying on a device;
calculating a current location along the travel route with a control unit;
identifying a travel segment with the current location with the travel segment having a travel distance;
commencing a single capture of the travel distance with the single capture invoke after the current location reached and continued from the business location;
correcting the travel distance by modifying a start of the single capture with the business location at a beginning of the travel segment; and
verifying the travel distance based on where the business location is within the travel segment.

7. The method as claimed in claim 6 wherein verifying the travel distance based on where the business location is within the travel segment includes:
- determining the business location is not at the beginning or at an end of the travel segment; and
- adjusting the travel segment to match the business location at the beginning or at the end of the travel segment.

8. The method as claimed in claim 6 wherein identifying the travel segment with the current location includes:
- identifying an appointment location, which is non-business, closest to the current location; and
- identifying a segment designation as non-business for the travel segment when the business location is not at the beginning or at an end of the travel segment.

9. The method as claimed in claim 6 further comprising terminating the single capture of the travel distance at an end of the travel segment.

10. The method as claimed in claim 6 further comprising terminating the single capture of the travel distance at an end of the travel route.

11. A navigation system comprising:
- a create route module for generating a travel route having a business location for displaying on a device;
- a current location module, coupled to the create route module, for calculating a current location along the travel with a control unit;
- a segment module, coupled to the current location module, for identifying a travel segment with the current location;
- a calculate distance module, coupled to the segment module, for capturing a travel distance for the travel segment;
- a verify module, coupled to the calculate distance module, for verifying the travel distance captured based on where the business location is within the travel segment; and
- a commence module, coupled to the verify module, for correcting the travel distance captured based on modifying a beginning and an end of the travel segment based on a location traversed on the travel route.

12. The system as claimed in claim 11 wherein the designation module is for identifying a segment designation as business for the travel segment when the business location is at the end of the travel segment.

13. The system as claimed in claim 11 wherein:
- the designation module is for identifying a segment designation as non-business for the travel segment when the business location is not at the beginning or at the end of the travel segment.

14. The system as claimed in claim 11 wherein the calculate distance module is for commencing a single capture of the travel distance with the current location has not yet reached the business location and includes:
- the commence module for correcting the travel distance by modifying a start of the single capture with the business location at the end of the travel segment.

15. The system as claimed in claim 11 wherein the calculate distance module includes:
- the commence module, coupled to the segment module, for commencing a single capture of the travel distance; and
- a terminate module, coupled to the commence module, for terminating the single capture of the travel distance when the business location is at the end of the travel segment.

16. The system as claimed in claim 11 wherein the calculate distance module is for commencing the single capture of the travel distance with the single capture invoke after the current location reached and continued from the business location and includes:
- the commence module for correcting the travel distance by modifying a start of the single capture with the business location at the beginning of the travel segment.

17. The system as claimed in claim 16 wherein:
- the verify module is for determining the business location is not at the beginning or at the end of the travel segment; and
- the calculate distance module is for adjusting the travel segment to match the business location at the beginning or at the end of the travel segment.

18. The system as claimed in claim 16 further comprising:
- an identify appointment module, coupled to the segment module, for identifying an appointment location, which is non-business, closest to the current location; and wherein:
- the segment module is for identifying the segment designation as non-business for the travel segment when the business location is not at the beginning or at the end of the travel segment.

19. The system as claimed in claim 16 wherein the calculate distance module includes a terminate module for terminating the single capture of the travel distance at the end of the travel segment.

20. The system as claimed in claim 16 wherein the calculate distance module includes a terminate module for terminating the single capture of the travel distance at the end of the travel route.

* * * * *